No. 851,783. PATENTED APR. 30, 1907.
A. E. SWANSON.
EXPANDING BIT.
APPLICATION FILED MAR. 5, 1906.

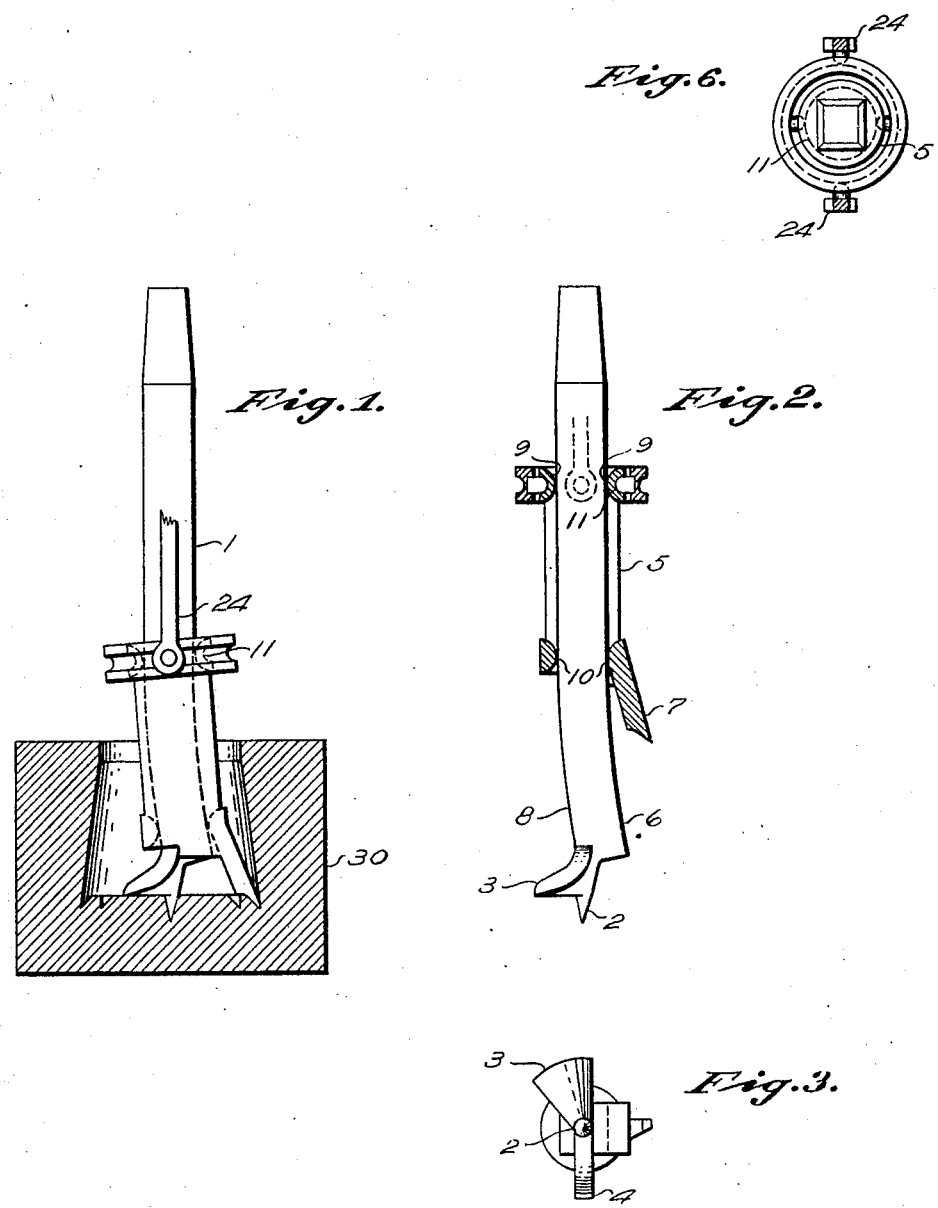

2 SHEETS—SHEET 2.

Witnesses: Inventor,
Axel E. Swanson
by Rummler & Rummler
Attorneys

UNITED STATES PATENT OFFICE.

AXEL E. SWANSON, OF CHICAGO, ILLINOIS.

EXPANDING BIT.

No. 851,783.  Specification of Letters Patent.  Patented April 30, 1907.

Application filed March 5, 1906. Serial No. 304,383.

*To all whom it may concern:*

Be it known that I, AXEL E. SWANSON, a citizen of the United States of America, and a resident of Chicago, county of Cook, and State of Illinois, have invented certain new and useful Improvements in Expanding Bits, of which the following is a specification.

Figure 5:
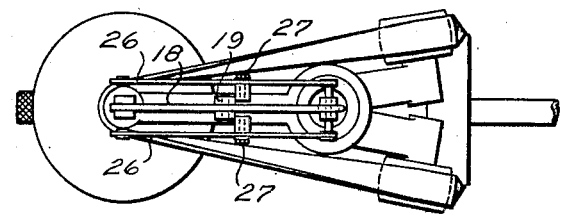
Figure 4:
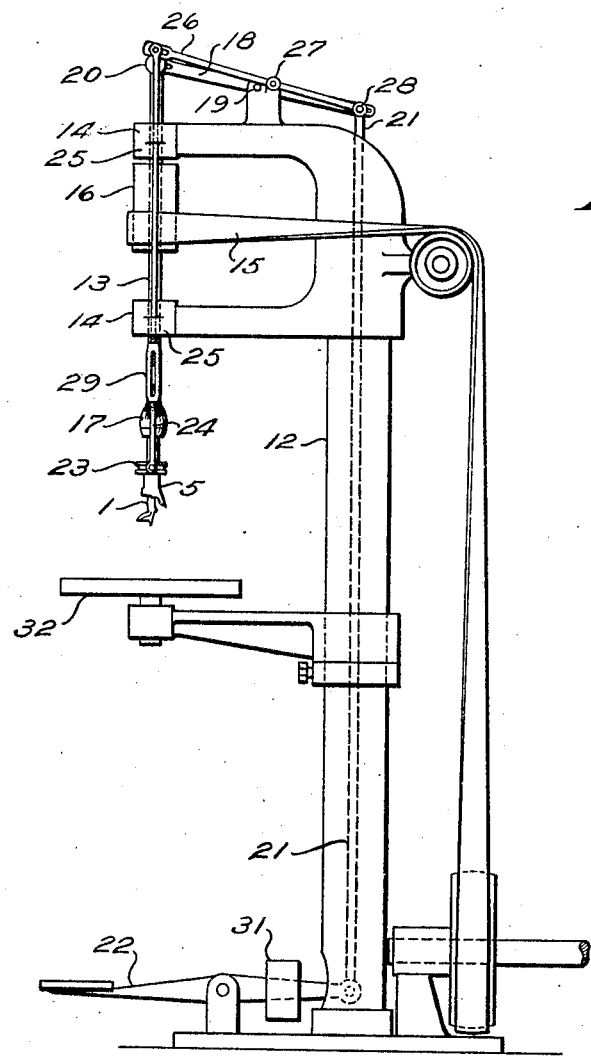

The main objects of this invention are to provide an improved, efficient, and durable form of bit for boring tapered holes, and to provide improved mechanism for operating a bit of this class whereby the tapered hole will be completely formed in a single operation. These objects are accomplished by the device shown in the accompanying drawings, in which:

Figure 1 is a side elevation of a boring tool constructed according to this invention and showing also the form of tapered hole which the tool is adapted to bore. Fig. 2 is a similar elevation of the same, showing the sleeve and its cutter blade in section. Fig. 3 is an end view of the same. Fig. 4 is a side elevation of a boring machine fitted with this form of boring tool. Fig. 5 is a top plan of the same. Fig. 6 is a detail of the connection between the sleeve 5 and its operating rods 24.

In the construction shown in the drawings, the bit 1 is provided with a shank having uniform cross-section throughout the greater part of its length. This bit is provided with the usual center point 2, and the usual cutting blades 3 and 4. A sleeve 5 is mounted to slide longitudinally along the shank of the bit 1. The sleeve 5 has rigid thereon a cutting blade 7. The shank is preferably prismatic or square, so as to cause the sleeve 5 to rotate therewith, and is curved or bent longitudinally, so that one face 6 thereof will serve as a guiding surface for causing the blade 7 to gradually increase its cutting radius when the sleeve 5 is shifted toward the cutting end of the bit. The surface 8 of the shank is curved to correspond with the surface 6.

The sleeve 5 has its inner surface so formed as to bear on the shank at four points 9 and 10 of relatively small area and located near the opposite ends of the sleeve. The walls of the sleeve 5 which are opposed to the surfaces 6 and 8 are cut away between the points 9 and 10 so as to permit the sleeve to readily follow the curvature of the shank 1. The sleeve 5 has an annular groove at 11 to provide a swiveled connection with the shifting links as will be hereinafter described.

A machine for operating this form of boring tool is illustrated in Figs. 4 and 5. The supporting frame 12 has a vertically disposed shaft 13 journaled therein and mounted to slide longitudinally in its bearings 14. The shaft 13 is driven by a belt 15 and a wide pulley 16 arranged to permit of the desired longitudinal shifting of the shaft 13. The shaft 13 has a chuck 17 at its lower end adapted to grip the shank 1 of the bit and securely hold the same in axial alinement with said shaft. The shaft 13 is shifted in its bearings by means of a lever 18 fulcrumed at 19 in the supporting frame and having swiveled connection at 20 with the shaft 13. The lever 18 is connected by means of a link 21 with a treadle lever 22.

The sleeve 5 has swiveled connection with a collar 23 by means of which the said sleeve is shifted along the shank of the bit 1 when said bit is lowered. The collar 23 is pivotally connected between a pair of rods or links 24 which are slidably mounted in lugs 25 at opposite sides of the bearings 14, and which extend parallel with the shaft 13 on the opposite sides thereof. These links are slid in their guides by means of a pair of levers 26 which are fulcrumed at 27 on the supporting frame 12 and connected with the link 21 by the same pivot 28 which connects said link with the lever 18. The fulcrums 27 are located between the pivot 28 and the fulcrum 19 so as to cause the sleeve 5 to shift at a greater speed than the bit is so shifted. The pivot 28 passes through an elongated slot in the lever 18 to provide for the play which is required at this point.

The connection between the links 24 and the sleeve 5 is preferably of the gimbal type as illustrated in Fig. 6 so as to permit the sleeve 5 to be tilted as in Fig. 1, while being rotated. The rods 24 are adjustable by means of a turn buckle 29 to provide for variation in the shifting of the sleeve 5 with respect to the bit 1. In this way the operator is able to control the distance to which the bit 1 will penetrate the block 30 which is being bored, before the blade 7 commences to cut the block and taper the hole. The turn buckles 29 should be so adjusted that the cutter 7 will reach its extreme position at the lower end of the bit as in Fig. 1 when the bit has penetrated the block to the desired depth.

The operation of the device shown is as follows: Assume that the shaft 13 is being continuously driven by the belt 15, and that the bit and sleeve 5 are normally urged to a lifted position by the counterweight 31 on the treadle lever 22. The operator then places the block 30 which is to be bored upon the table 32 and by pressing downward upon the treadle lever 22, causes the bit to penetrate the block as the link 21 is pushed upward, the lever 18 forces the bit 1 downward, and the levers 26 simultaneously force the sleeve 5 downward. On account of the difference in length of the corresponding arms of the levers 18 and 26, the descent of the sleeve 5 is more rapid than that of the bit. This causes the cutter 7 to follow the bit 1 into the hole which is bored thereby and to gradually overtake the cutter of the bit until said bit has reached the limit to which it is desired to bore. On account of the adjustment of the turn buckles 29, the cutter 7 will by this time have also reached the bottom of the hole cut by the bit. Since the sleeve 5 can move no further along the bit, further descent of the bit is prevented. It is preferred to adjust the table 32 on the supporting frame, to such position that the sleeve 5 will arrive at its lower limit of movement along the bit 1 when the treadle 22 has been pushed to the lower limit of its movement.

What I claim as my invention and desire to secure by Letters Patent is:

1. A device for boring tapered holes comprising a bit having a shank bent toward one side at its lower end, and a sleeve slidably mounted on said shank and having thereon a cutting blade, said sleeve being adapted to tilt so as to cause said blade to shift outward when said sleeve is slid downward on said shank.

2. A device of the class described comprising a shank, a sleeve slidably mounted on said shank and having thereon a cutting blade, a guiding surface on said shank adapted to tilt said sleeve for causing said blade to shift outwardly when said sleeve is moved downward along said shank.

3. A device of the class described comprising a shank, a sleeve slidably mounted on said shank and having thereon a cutting blade, said sleeve being secured against rotation relatively of said shank, a guiding surface on said bit adapted to tilt said sleeve for causing said blade to shift outwardly when said sleeve is moved downward along said shank.

4. A device of the class described comprising a bit, a sleeve slidably mounted on said bit and having thereon a cutting blade, a guiding surface on said bit adapted to tilt said sleeve for causing said blade to shift outwardly when the sleeve is moved downward along said bit, means for rotating said bit, and mechanism for urging said bit downwardly and adapted to simultaneously cause said sleeve to shift downwardly along the shank of the bit.

5. In a boring machine, the combination of a frame, a shaft journaled therein, a bit secured at one end of said shaft and having its point in axial alinement therewith, a sleeve slidably mounted on the shank of said bit and having thereon a cutting blade, a guiding surface on said shank adapted to cause said sleeve to tilt when shifted along said shank for moving said blade downwardly, means for rotating said shaft, mechanism for shifting said shaft longitudinally in its bearings, and mechanism adapted to shift said sleeve at a different rate of speed while said shaft is being shifted.

6. In a machine of the class described, the combination of a frame, a shaft journaled in said frame and slidable longitudinally in its bearings, a bit mounted on said shaft, a sleeve slidably mounted on said bit and having thereon a cutting blade, one or more guiding surfaces for causing said blade to shift outwardly when said sleeve is moved toward the point of said bit, means for shifting said shaft longitudinally in its bearings and adapted to cause said sleeve to simultaneously shift along said bit.

7. In a machine of the class described, the combination of a frame, a shaft journaled in said frame and slidable longitudinally in its bearings, a bit mounted on said shaft, a sleeve slidably mounted on said bit and having thereon a cutting blade, one or more guiding surfaces for causing said blade to shift outward from the axis when said sleeve is moved toward the point of said bit, a lever fulcrumed on said frame and connected with said shaft for shifting the same longitudinally in its bearings, a second lever fulcrumed on said frame, a link connecting said lever with said sleeve, and means for simultaneously swinging said levers on their fulcrums, the arms of said levers being respectively of different lengths, whereby said bit and sleeve will be shifted at different speeds.

8. In a machine of the class described, the combination of a frame, a shaft journaled in said frame and slidable longitudinally in its bearings, a bit mounted on said shaft, a sleeve slidably mounted on said bit and having thereon a cutting blade, one or more guiding surfaces for causing said blade to shift outward from the axis when said sleeve is moved toward the point of said bit, a lever fulcrumed on said frame and connected with said shaft for shifting the same longitudinally in its bearings, a second lever fulcrumed on said frame, a link connecting said lever with said sleeve, said link being adjustable for controlling the relative movements of said sleeve and bit, means for simultaneously swinging said levers on their fulcrums, the arms of said levers being respectively of different lengths, whereby said bit and sleeve will be shifted at different speeds.

Signed at Chicago this 1st day of March, 1906.

AXEL E. SWANSON.

Witnesses:
L. SWANSON,
L. A. SMITH.